United States Patent [19]

Stuart

[11] 4,185,361

[45] Jan. 29, 1980

[54] LOCKING DEVICE

[76] Inventor: Robert B. Stuart, 1608 Crown St., Medford, Oreg. 97501

[21] Appl. No.: 900,054

[22] Filed: Apr. 26, 1978

[51] Int. Cl.[2] ........................ A44B 21/00; F16L 33/00

[52] U.S. Cl. ................................ 24/73 SG; 24/73 A; 24/81 SK; 24/16 R; 70/58; 70/18; 280/11.37 A

[58] Field of Search .................... 24/81 SK, 16, 73 A, 24/56, 73 CS, 73 LA, 73 R; 70/30, 15, 18, 17, 58; 224/45 S, 5 Z; 280/11.37 A, 11.37 K; 211/60 SK

[56] References Cited

U.S. PATENT DOCUMENTS

| | | | |
|---|---|---|---|
| 738,983 | 9/1903 | Burdick | 70/17 |
| 852,180 | 4/1907 | Hoffman | 24/115 H |
| 1,464,262 | 8/1923 | Fish | 70/15 |
| 2,355,705 | 8/1944 | Cohn | 24/16 R |
| 3,091,011 | 5/1963 | Campbell | 24/81 |
| 3,590,608 | 7/1971 | Smyth | 70/15 |
| 3,653,565 | 4/1972 | McAusland | 224/45 S |
| 3,714,803 | 2/1973 | Chenenko | 70/58 |
| 3,727,934 | 4/1973 | Averbook | 280/11.37 K |
| 3,838,585 | 10/1974 | Foote | 70/58 |
| 3,886,770 | 6/1975 | Smith | 70/58 |
| 3,947,927 | 4/1976 | Rosenthal | 24/81 SK |
| 3,959,995 | 6/1976 | Fletcher | 70/18 |
| 3,990,279 | 11/1976 | Brickel | 70/233 |
| 3,999,410 | 12/1976 | Hall | 70/58 |

FOREIGN PATENT DOCUMENTS

| | | | |
|---|---|---|---|
| 537363 | 12/1955 | Italy | 24/16 R |

*Primary Examiner*—Bernard A. Gelak
*Attorney, Agent, or Firm*—Klarquist, Sparkman, Campbell, Leigh, Hall & Whinston

[57] ABSTRACT

A locking device for skis or the like comprises two lengths of cable having loops formed at their remote ends and an intervening length of chain. By inserting the free ends of the cables through appropriate links in the chain and thereafter locking the free ends together, the size of the loops can be adjusted so that objects to be locked together can be snugly embraced by the opposite cable lengths.

1 Claim, 5 Drawing Figures

FIG. 1
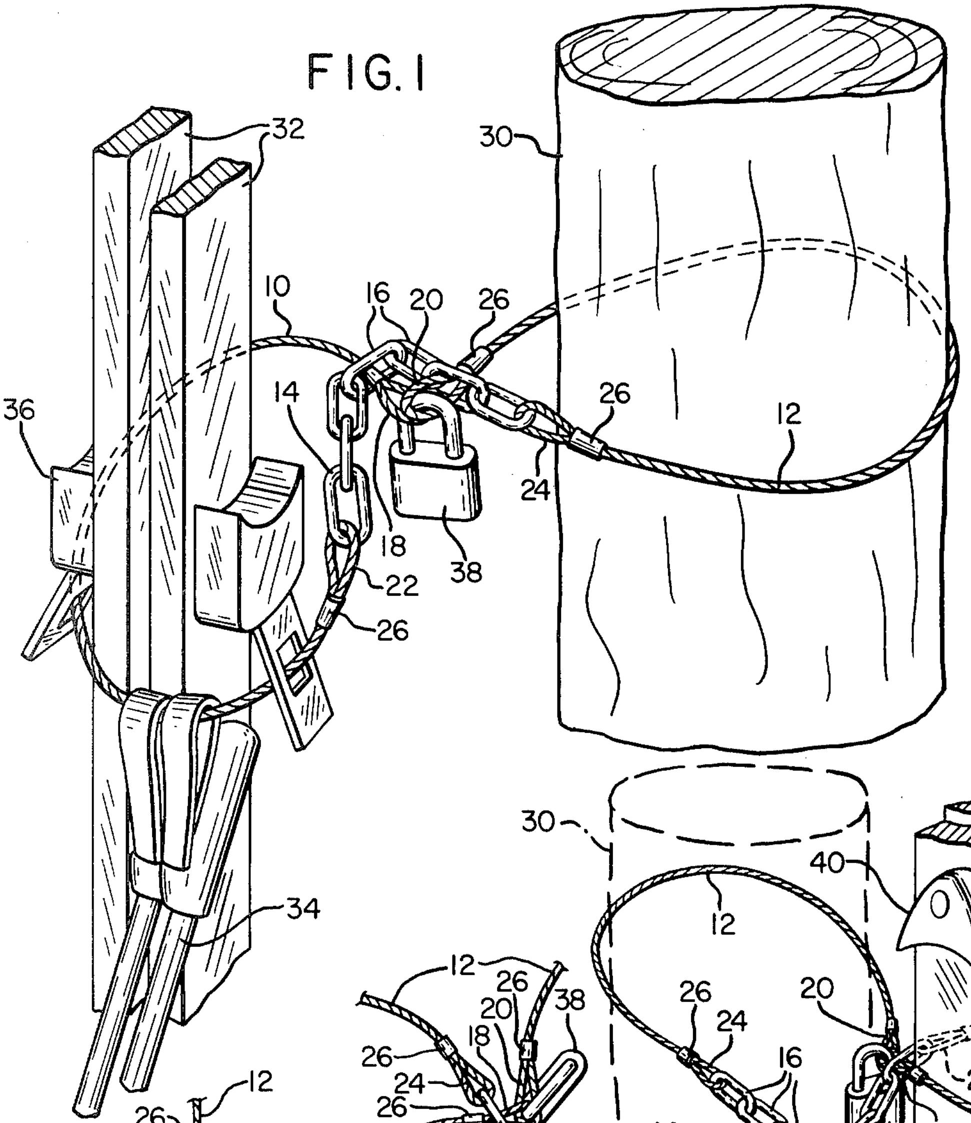
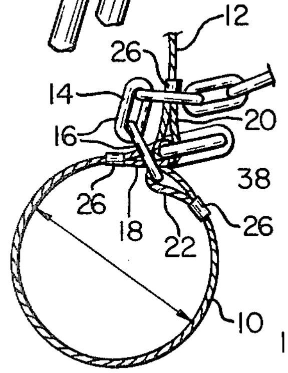
FIG. 3
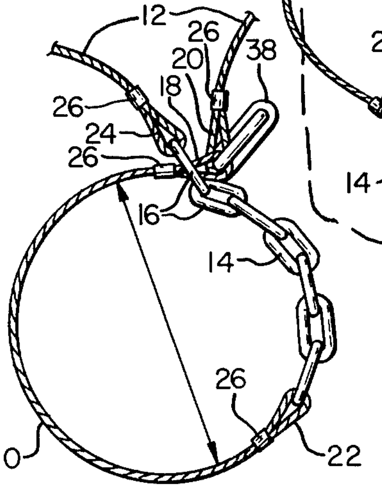
FIG. 4
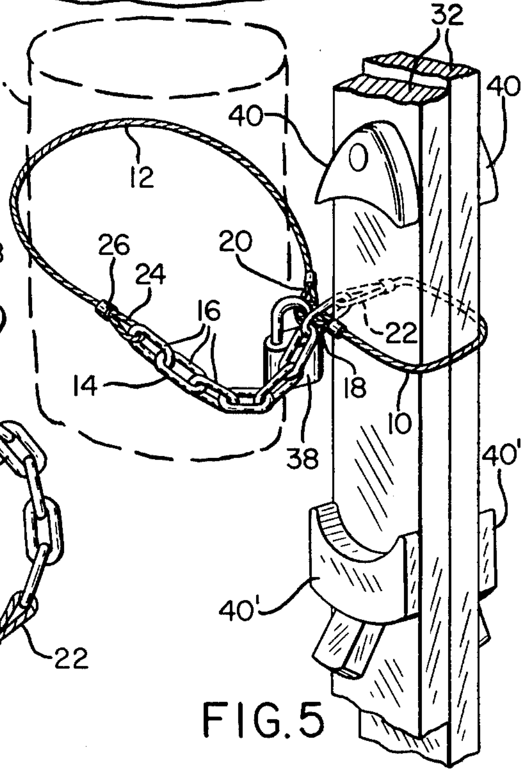
FIG. 5
FIG. 2
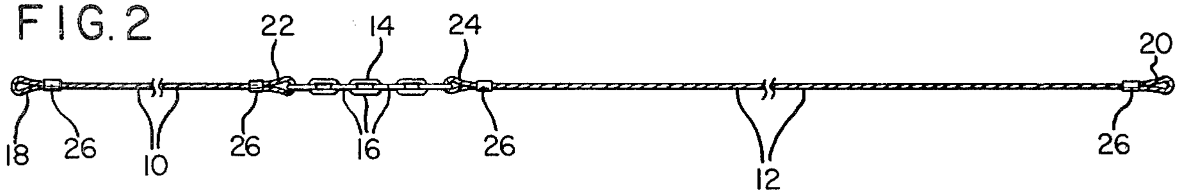

LOCKING DEVICE

BACKGROUND OF THE INVENTION

Thefts of skis or other items is a continuing problem. Numerous suggestions have been made to devices for securing skis, bicycles or other valuable items, to a fixed object to prevent their unauthorized removal. Most of these devices required the manufacture of special components, and for one reason or another, were not completely satisfactory.

SUMMARY OF THE INVENTION

The principal object of the present invention is to provide a locking device for preventing theft of skis or the like, which is relatively light in weight, and which may be easily carried about, but which in operation is effective to prevent removal of the locked object.

Another object of the invention is to provide a locking device which can be manufactured of standard, readily available components.

Still another object of the invention is to provide a locking device comprising a flexible tether capable of forming loops of adjustable sizes.

These and other objects of the invention are obtained by a tether comprising two lengths of flexible cable having loops at the free ends thereof and connected together by a length of chain. By selectively inserting the free end of a cable length through a loop in the chain, the size of the opening defined by the cable length can be adjusted so as to snugly engage the skis or other object to be secured, the loops at the ends of the cable being adapted to receive a padlock or the like.

DRAWINGS

FIG. 1 is a fragmentary perspective view showing the locking device of the invention in position to secure a pair of skis and ski poles to a fixed telephone pole or the like;

FIG. 2 is a plan view of the tether of the invention showing it in an extended position;

FIG. 3 is a view showing the tether arranged to form a small opening with one of the cable links;

FIG. 4 shows how the tether may be arranged to form a larger opening; and

FIG. 5 is a fragmentary perspective view showing another manner of using the locking device of the invention.

DETAILED DESCRIPTION OF THE INVENTION

Referring now to the drawings, a tether constructed in accordance with the invention comprises a first length of cable 10 and a second length of cable 12 which are connected together by a length of chain 14 having a plurality of links 16. The cable length 10 is provided with a fixed eye or a loop 18 at its free end, and the cable length 12 is similarly provided with a fixed eye or loop 20 at its free end.

The cable lengths 10, 12 are preferably of a flexible stranded cable, and each is preferably provided with a plastic sheath (not shown) to prevent marring or scratching of any surface embraced by the cable. The loops or eyes 18, 20 and the eyes 22, 24 connecting the cable ends to the opposite ends of the chain 14, may be formed in a suitable manner such as by splicing or by crimping collars 26 about the cable and the laid-over ends in a conventional manner.

Referring now more particularly to FIG. 2, to lock a pair of skis or the like to prevent their theft, one of the cable lengths, such as the length 12, is wrapped about a fixed object such as a post 30, and the eye 20 inserted through one of the links of the chain 14. The other chain length 10 is wrapped about an object to be secured, in this instance illustrated as a pair of skis 32, and poles 34. In FIG. 2 the cable 10 is shown as having been threaded through openings in the bindings 36 of the skis and through the straps of the poles 34, the free end loop 18 thereafter being inserted through a link of the chain 10 and a padlock 38 inserted through the loops 18, 20.

Alternatively, the cable length 10 could be utilized as shown in FIG. 5 wherein it is illustrated as wrapped snugly around a pair of skis between protruding portions 40, 40' of the bindings of the skis. The free end loop 18 of the cable length 10 is inserted through an appropriate link of the chain 14 such that when locked, the opening defined by the chain and the cable length 10 is so small that the tether cannot be slipped over the binding portions 40, 40', thus securing the skis from removal.

In place of the chain links 14, an elongated intermediate tether section of other form may be used, such as for example, a plate having a plurality of openings spaced longitudinally thereof and through which the free ends of the cable lengths could be inserted selectively to adjust the size of the openings defined by such cable lengths. However, because of its ready availability and the other apparent advantages, the use of an intermediate length of chain is preferred.

It will be obvious that the tether of the invention can be manufactured inexpensively and that it can be easily manufactured from readily available components requiring no special manufactured items. Moreover, it can be easily carried about and easily secured in position to lock skis, a bicycle or other objects, to prevent unauthorized removal.

FIGS. 3 and 4 illustrate how a size of the opening defined by one of the lengths of the tether can be adjusted by selecting the chain link through which the end of the cable is inserted.

Having illustrated the preferred embodiment of the invention, it should be apparent that it permits for modification and arrangement in detail.

I claim:

1. A tether comprising,
- a first length of flexible cable having
- a lock-receiving loop at one free end thereof,
- a length of chain comprising a plurality of links connected at one end of its ends to the other end of said first length of cable,
- a second length of cable connected at one of its ends to the other end of said length of chain and having a lock-receiving eye at its other free end,
- whereby the diameter of the loop formed by either of said cable lengths can be varied by inserting the free end of a cable length through a selected one of said chain links.

* * * * *